(No Model.) 6 Sheets—Sheet 1.

G. A. KNOX.
SOLE EDGE BURNISHING MACHINE.

No. 480,021. Patented Aug. 2, 1892.

WITNESSES
H. Brown
W. E. Ramsay

INVENTOR
G. A. Knox (No Model.)  6 Sheets—Sheet 2.

G. A. KNOX.
SOLE EDGE BURNISHING MACHINE.

No. 480,021. Patented Aug. 2, 1892.

WITNESSES
H. Brown
N. C. Ramsay

INVENTOR
G. A. Knox
by Wright Brown Knosley
Attys.

(No Model.)  6 Sheets—Sheet 4.
G. A. KNOX.
SOLE EDGE BURNISHING MACHINE.
No. 480,021. Patented Aug. 2, 1892.
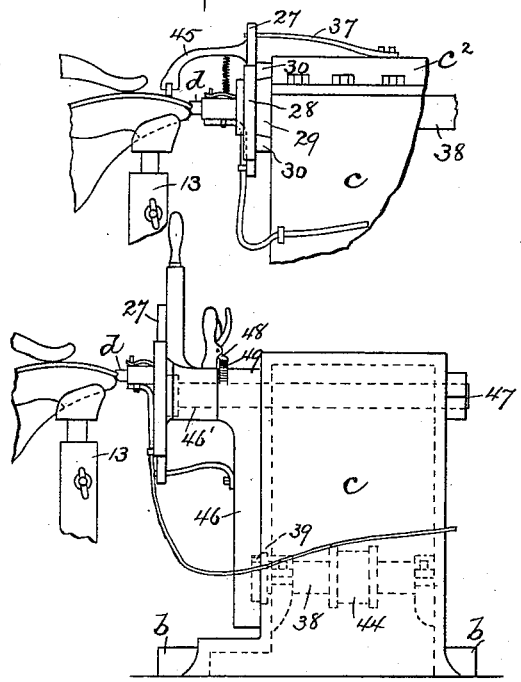
FIG. 4.
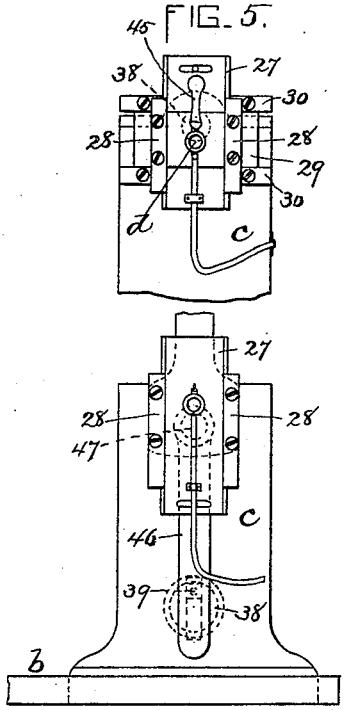
FIG. 5.
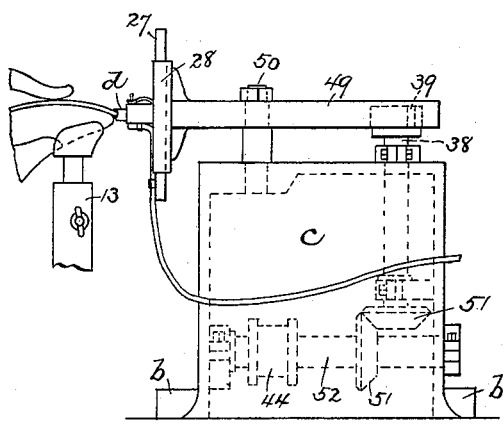
FIG. 6.
FIG. 8
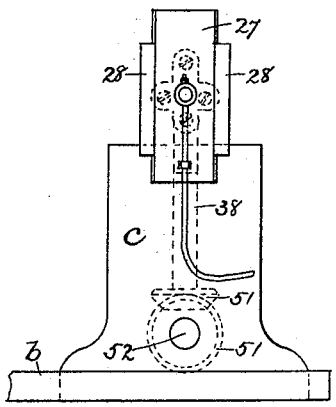
FIG. 7.
FIG. 9.
WITNESSES
H Brown
W. C. Ramsay
INVENTOR
G. A. Knox

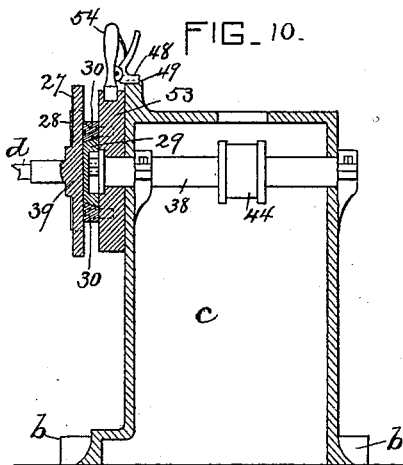

(No Model.) 6 Sheets—Sheet 6.
G. A. KNOX.
SOLE EDGE BURNISHING MACHINE.
No. 480,021. Patented Aug. 2, 1892.
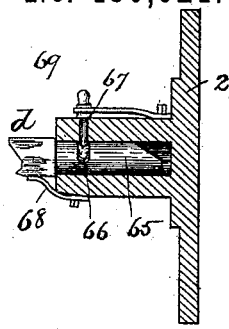
FIG. 16.
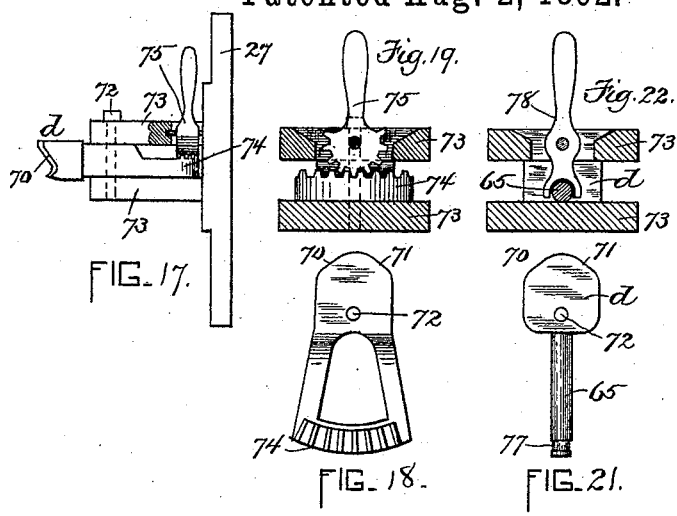
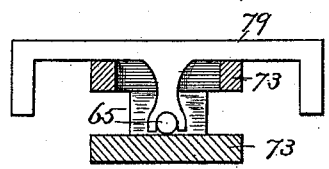
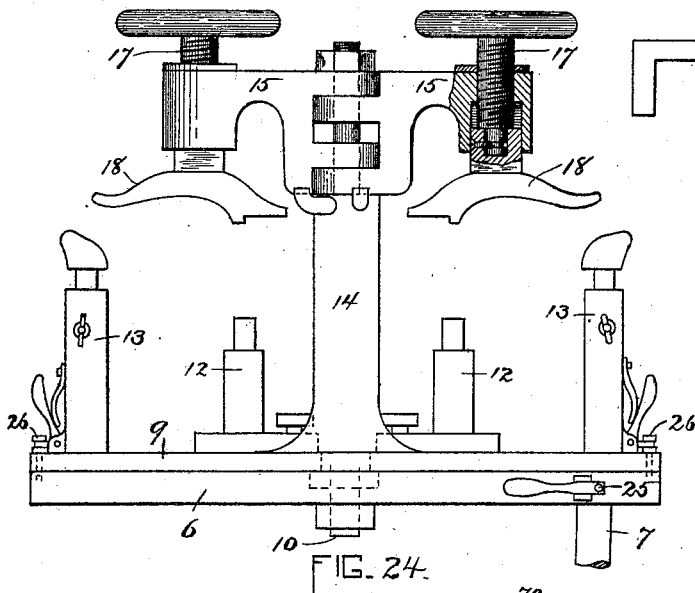
FIG. 24.
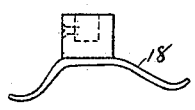
FIG. 25.
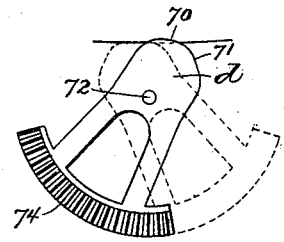
FIG. 20.
WITNESSES
H. Brown
W. C. Ramsay.
INVENTOR
G. A. Knox
by Wright Brown Crosby
Attys.
THE NORRIS PETERS CO., PHOTO-LITHO., WASHINGTON, D. C.

UNITED STATES PATENT OFFICE.

GEORGE A. KNOX, OF LYNN, MASSACHUSETTS.

SOLE-EDGE-BURNISHING MACHINE.

SPECIFICATION forming part of Letters Patent No. 480,021, dated August 2, 1892.

Application filed September 3, 1889. Renewed December 30, 1891. Serial No. 416,565. (No model.)

*To all whom it may concern:*

Be it known that I, GEORGE A. KNOX, of Lynn, in the county of Essex and State of Massachusetts, have invented certain new and useful Improvements in Sole-Edge-Burnishing Machines, of which the following is a specification.

This invention has for its object to provide a simple and effective sole-edge-burnishing machine, in which the labor on the part of the operator shall be reduced to the minimum and be confined, mainly, to the acts of jacking and unjacking the boots or shoes and applying the power that operates the machine.

The invention consists in the various combinations hereinafter set forth, comprising an organized machine in which the boot or shoe is held stationary by a jack while one of its shank and sole edges is being burnished from the shank to the toe by a progressively-moving burnishing-tool and then given a half-rotation while the progressive movement of said tool is interrupted, thereby presenting the toe portion to the tool and bringing the opposite sole and shank edge to position to receive the action of the tool when the progressive movement of the latter is resumed, the tool being thus caused to act on all parts of the sole edge from the shank at one side around to the shank at the opposite side.

In the accompanying drawings, forming a part of this specification, Figure 1 represents a top plan view of an organized machine embodying my invention. Fig. 2 represents a side elevation of the same. Fig. 2ª represents a view of a part detached from the machine. Fig. 3 represents an end elevation of the machine. Figs. 4 to 15, inclusive, represent various devices which may be employed to operate the burnishing-tool and give it the necessary freedom of movement to adapt it to the upward and downward and inward and outward curves of a sole edge held in a fixed position, Fig. 4 being a side and Fig. 5 a front elevation of one arrangement or modification, Fig. 6 a side and Fig. 7 a front elevation of another modification, Fig. 8 a side and Fig. 9 a front elevation of another modification, Fig. 10 a sectional view of another modification, Fig. 11 a sectional view of another modification, Fig. 12 a sectional view of another modification, Fig. 13 a sectional view of another modification, Fig. 14 a sectional view of another modification, and Fig. 15 a side elevation of another modification. Figs. 16 to 23, inclusive, represent views of various forms of burnishing-tools and means for adjusting the same, Fig. 16 being a sectional view of one form or modification of tool and its holder, Fig. 17 a side elevation of another modification, Fig. 18 a top view of another form of tool, Fig. 19 an end view of the tool shown in Fig. 18 and its adjusting device and a sectional view of the holder for said tool, Fig. 20 a top view of the tool shown in Fig. 18 in different positions, Fig. 21 a top view of another form of tool, Fig. 22 an end view of the tool shown in Fig. 21, its shank being in section, and a sectional view of the holder of said tool, and Fig. 23 an end view of the tool shown in Fig. 21, a sectional view of its holder, and an elevation of a different device for adjusting the tool. Fig. 24 represents a jack differing in construction in certain particulars, hereinafter specified, from that shown in Figs. 1, 2, and 3. Fig. 25 represents a modification of one of the clamps belonging to the jack.

The same letters and numerals of reference indicate the same parts in all of the figures.

In the drawings, *a* represents the supporting-frame provided with horizontal ways *b b*, on which a head or carriage *c* is fitted to slide horizontally. Said head or carriage carries a sole-edge-burnishing tool *d*, which is rapidly reciprocated by means hereinafter described. Said head or carriage is moved progressively on the ways *b* at a suitable rate to carry the rapidly-reciprocating burnishing-tool along the edge of a boot or shoe sole which is held by a suitable jack *e*, hereinafter described, at one side of the head or carriage. After the head or carriage has moved progressively far enough to carry the tool from the shank to the commencement of the curve of the toe it (the carriage) is held at rest, (the reciprocating movement of the tool continuing,) and while the carriage is at rest the jack is given a half-rotation, thus reversing the position of the boot or shoe and presenting the other edge of its sole to the burnishing-tool *d*, the curved toe portion being burnished by contact with the reciprocating tool during the semi-rotation of the jack. After the reversal of the position of the jack the progressive movement of the head or carriage is resumed and the reciprocating tool is carried thereby along the sole edge from the toe to the shank, thus completing the burnishing of the sole-edge.

The carriage c may be reciprocated by any suitable means. I have here shown as the carriage-reciprocating devices a disk f, mounted on a shaft g and having a cam-groove h, Fig. 2, in one side a lever i, pivoted at its lower end at j to an ear or bracket k, affixed to the supporting-frame and provided with a stud or trundle-roll m, which enters the cam-groove h, a rod n, connecting the swinging end of the lever i with an ear o on the carriage c, and means for positively rotating the shaft g and disk f. The rotation of the disk f in the direction indicated by the arrow on said disk in Fig. 2 causes the cam-groove h to move the lever i and through the rod n to move the carriage c in the direction indicated by the arrow marked thereon in Fig. 2, thus moving the reciprocating burnishing-tool progressively along the sole edge from the shank toward the toe of a boot or shoe on the jack. The cam-groove is eccentric to the axis of the disk from its inner end 2 to the point 3 and from the point 3 is concentric with said axis to the point 4 and from the point 4 to its outer end 5 is eccentric to the axis of the disk. The carriage is therefore first given a forward movement in the direction indicated by the arrow marked thereon by the portion 2 3 of the cam-groove, and is then held at rest by the concentric portion 3 4 of said groove, and lastly is given a second forward movement by the eccentric portion 4 5 of the cam-groove. The first forward movement of the carriage carries the burnishing-tool from the shank portion of the sole edge to the commencement of the curve of the toe, and while the carriage is at rest the jack e is given a half-rotation by means hereinafter described, thus presenting the toe portion to the burnishing-tool and bringing the other edge of the sole into position to be acted on by the tool during the second forward movement of the carriage. The shaft g and disk f are rotated by means of a worm-gear p, affixed to the shaft, and a worm q, meshing with said gear and affixed to a shaft r, which is journaled in bearings on the supporting-frame. The shaft r is provided with two loose pulleys s s', which are connected by belts with correspondingly-located pulleys t t' on the driving-shaft u, one of said belts being crossed and the other open, so that the pulleys s s' are rotated in opposite directions. On the shaft r, between the loose pulleys s s', is a clutch v, which is engaged with the shaft r so as to rotate therewith, and is adapted to slide on said shaft. The clutch is controlled by a lever w, which is pivoted at x to the frame a, and is adapted to throw the clutch into engagement with a corresponding clutch member v', Fig. 2, on either of the pulleys s s'. When the clutch is engaged with the pulley s, the shaft r is rotated in one direction and gives motion in one direction to the carriage c through the described intermediate devices. When the clutch is engaged with the other pulley s', the carriage is moved in the opposite direction. The operator is therefore enabled to impart motion in either direction to the carriage by moving the clutch v. The driving-shaft u is provided with two fast pulleys y y' and a loose pulley z, located between said fast pulleys. The belt that communicates motion to the driving-shaft from the source of power is adapted to run on either of said pulleys and may be shifted from one to another by a shipper a', attached to a shipper-bar b'. Said bar slides in fixed guides c' on the frame of the machine and is provided with adjustable collars d' e', Fig. 1, which are arranged at opposite sides of a lug f' on the carriage. The collar e' is arranged to be struck by the lug f' while the carriage is making its second progressive movement, the contact of the lug f' with the collar moving the shipper so as to transfer the driving-belt from the fast pulley y to the loose pulley z, and thus stop the machine, the stoppage occurring at the completion of the burnishing operation. The jack e is here shown as adapted to hold two boots or shoes at the same time. It is composed of a base-plate 6, connected at one end by a pivot 7 with an ear 8 on the supporting-frame, an upper plate 9, pivoted at its center at 10 to the base-plate, heel and toe supporting standards 12 13 on said plate 9, a central post 14 on said plate 9, having arms 15 15, containing screw-threaded sockets, and vertical screw-shafts 17, engaged with said sockets and provided at their lower ends with clamps 18, formed to bear simultaneously on the heel and sole of a boot or shoe supported by said standards 12 13. The pivot-rod 7, which connects the base-plate 6 to the fixed ear 8, has a pinion 19 affixed to its lower end, said pinion meshing with a rack 20, which is fitted to slide on suitable guides on the frame a. Said rack is connected by a rod 21 with a lever 22, which is pivoted at j' to a fixed arm or bracket 23, Fig. 3, on the frame of the machine and is provided with a lug having a trundle-roll 24, entering a cam-groove h', (shown in Fig. 2ª,) in the side of the disk f opposite that in which the cam-groove h is formed. The cam-groove h' is composed of a concentric portion 2' 3', formed to hold the lever 22 at rest during the first progressive movement of the carriage, an eccentric portion 3' 4', formed to move said lever and the rack at the completion of said first progressive movement sufficiently to give the jack e a half-rotation, thus reversing the position of the boot or shoe and at the same time presenting the toe portion of its sole edge to the burnishing-tool, as above described, and another concentric portion 4' 5', formed to hold the lever 22 at rest during the second progressive movement of the carriage. After the completion of the second progressive movement of the carriage and while the machine is stopped, the operator unlocks the base-plate 6 of the jack from the pivot-bolt 7 by withdrawing a locking-bolt 25, Fig. 3, and turns the jack on said bolt to the position shown in Fig. 3, and then by withdrawing a locking-bolt 26, which engages the upper plate 9 with the base-plate, he releases the upper plate and gives it a half-rotation on its central pivot 10, thus bringing the boot or shoe on the other division of the jack into position to be acted on by the tool when the jack shall have been swung back to its normal position, the object of swinging the jack outwardly, as described, being simply to obtain room in which to reverse the jack upon the central pivot. After the reversal of the jack the operator starts the machine in motion by transferring the driving-belt from the loose pulley $z$ to the fast pulley $y'$ by moving the shipper-bar $b'$. Said bar is engaged with the clutch-operating lever $w$, so that the last-mentioned movement of the shipper-bar also throws the clutch $v$ in the direction required to reverse the rotation of the disk $f$, and thus moves the carriage progressively in a direction opposite to the direction of its above-described movements, the carriage being given its first progressive movement in a direction opposite that indicated by the arrow in Fig. 2, then held at rest while the jack is being semi-rotated, and then given its second progressive movement, at the end of which the lug $f'$ on the carriage $c$ strikes the collar $d'$ on the shipper-bar $b'$, and thereby causes the shipper to move the belt from the fast pulley $y'$ to the loose pulley $z$ and again stop the machine. This completes one round of the operation of the machine, the succeeding operations being duplicates of that already described.

It will be observed that the employment of the double reversible jack enables the operator to apply the boot or shoe to and remove it from each branch of the jack while the boot or shoe on the other branch is being acted upon, so that no time is lost in applying and removing the work. I do not limit myself, however, to the employment of a double jack, but may employ a single jack adapted to hold but one boot or shoe at a time.

The burnishing-tool has a horizontal yielding movement in a direction at right angles to the movement of the head or carriage and is held with a yielding pressure against the sole edge, its horizontal movability enabling it to conform to the outward and inward curves of the sole edge. The tool is also adapted to rise and fall while in operation, and thus conform to the upward and downward curves of the sole edge. Several different ways are shown in the drawings for providing said movements of the tool. In Figs. 1, 3, 4, and 5 I show the tool attached to a vertically-movable slide 27, which is fitted to move between vertical guides 28 28 on a cross-head 29. Said cross-head is rapidly reciprocated by means presently described to operate the tool and is fitted to move between horizontal guides 30 30 on a section $c^2$, Figs. 1 and 2, of the carriage $c$, which is fitted to move horizontally on guides or ways 31 31, affixed to the main portion of said carriage, said section being movable at right angles to the direction of the progressive movement of the carriage and giving the inward and outward movements to the tool. The movable section $c^2$ is pressed outwardly to hold the tool $d$ with a yielding pressure against the sole edge by a weighted lever 32, Figs. 2 and 3, attached to a strap or cord 33, which is attached to the section $c^2$ at 34, and passes over the pulleys 35 36 on the carriage to the weighted lever 32. The vertically-movable slide 27 gives the tool its upward and downward movements, and is preferably supported in a normal or initial position by a spring 37, Figs. 3 and 4, which is attached at one end to the section $c^2$ and has its free end engaged with the slide 27, said spring enabling the slide to ascend or descend from its normal position. The cross-head 29 and the tool supported thereby are reciprocated horizontally by an eccentric wrist-pin 39, affixed to a horizontal shaft 38, which is journaled in bearings on the carriage and is rotated by power communicated from the driving-shaft $u$ through a belt 40, running from an elongated pulley 41 on said shaft over flanged idle-pulleys 42 42 on a bracket 43, attached to the carriage $c$, and a pulley 44 on the shaft 38. The elongated pulley 41 is of sufficient length to enable it to operate the belt 40 during the entire progressive movements of the carriage $c$, the flanged idle-pulleys 42 moving with the carriage and causing the belt to also move with the carriage along the periphery of the elongated pulley 41. I prefer to provide the vertical slide 27 with an arm or presser-foot 45, Figs. 4 and 5, having at its outer end a roller arranged to bear on the tread-surface of the sole, said arm enabling the upward and downward curvature of the tread-surface to raise and lower the burnishing-tool, thereby obviating liability of injury to the sole edge by the lip of the burnishing-tool. If only the engagement of said lip with the edge of the sole were relied on to cause the tool to rise and fall, the sole edge might be marred by the slipping of the tool from its operative engagement with the sole edge.

In Figs. 6 and 7 I show the burnishing-tool $d$ and the vertically-movable slide 27 supported by a lever 46, which is mounted to oscillate on a pivot 47, affixed to the carriage $c$. Said lever is oscillated by an eccentric 39 on a shaft 38, journaled in bearings in the carriage $c$, the eccentric being engaged with the lower end of the lever 46. The tool is in this case vibrated in the arc of a circle; but said arc is so short that the deviation from a rectilinear movement is not perceptible. The inward and outward movement of the tool at right angles to the progressive and reciprocating movements is effected by making the main portion of the carriage movable toward and from the jack, and this may be accomplished by making the carriage in two sections, as above described, the lower one of which is movable on the guides or ways $b\ b$ to carry the tool along the edges of the sole, while the other is movable on guides or ways on the lower section to carry the tool out and in as required by the outward and inward curvature of the sole edge. The lever 46 has a pivoted upper section 46', said lever and its pivoted section being detachably connected by a dog 48 on the section 46', and toothed or notched segment on the main portion of the lever. The section 46', which directly supports the slide 27 and tool $d$, is thus enabled to be turned on the pivot 47 to cause the acting-face and lip of the tool to move either horizontally or at any desired angle, the dog 48 and segment 49 enabling the section 46' to be locked to the lever 46 at any position to which it may be adjusted.

In Figs. 8 and 9 the tool $d$ and vertical slide 27 are shown as supported by a horizontal lever 49, which is mounted to oscillate horizontally on a vertical pivot 50 on the carriage $c$, and is oscillated by an eccentric 39 on a vertical shaft 38, journaled in bearings in the carriage $c$. The vertical shaft 38 is connected by gears 51 with a shaft 52, which is driven by the belt 40.

In Fig. 10 I show the tool $d$, vertical slide 27, and cross-head 29, the latter being fitted to reciprocate between guides 30 on a holder 53, which is pivoted or fitted to turn freely on the shaft 38, having the eccentric 39, which reciprocates said cross-head. The holder 53 has a dog 48, which engages a notched segment 49 on the carriage and is adapted to hold the holder 53, with the guides 30, either horizontal or at any desired angle, so that the cross-head 29 may be reciprocated either in a horizontal or in an inclined path, and thus adapted to the varying curvature of the sole edge. The holder 53 has a handle 54, by which the operator may turn it from time to time to govern the direction of movement of the tool.

Fig. 11 shows the vertical tool-carrying slide 27 mounted on a horizontal lever 55, which is pivoted at its rear end on a vertical arm 56. 57 represents a vertical arm attached to a cross-head 58 and engaged with the lever 55 near its swinging end. Said arm 55 is attached to a cross-head 58, which is fitted to slide between guides 59 on a holder 60, which is rigidly attached to a shaft 61, which is journaled in bearings on the carriage $c$. Said shaft has an eccentric 62, engaged with the cross-head 58, so that the rotation of the shaft reciprocates the cross-head. The arm 56 is attached to the shaft 61 and has a dog 48, which engages the notches of a notched segment 49 on the carriage $c$. By disengaging said dog from the segment the arm 56 may be turned with the shaft 61 and the holder 60 attached to said shaft, so as to cause the guides 59 on said holder to stand either horizontally or at any desired incline, thus enabling the operator to govern the direction of movement of the tool, as in the constructions shown in Figs. 6 and 10.

Fig. 12 shows a construction substantially like that shown in Fig. 6 and differing from the latter only in that the lever 46 has a hub on which the section 46' is journaled.

Fig. 13 shows a construction similar to that shown in Figs. 6 and 12, excepting that the lever 46 is made in one piece instead of being in sections, no provision being made for varying the direction of the reciprocating movement of the tool.

Fig. 14 shows a construction like that shown in Fig. 12, excepting that the lever 46 is made in one piece.

Figure 1:
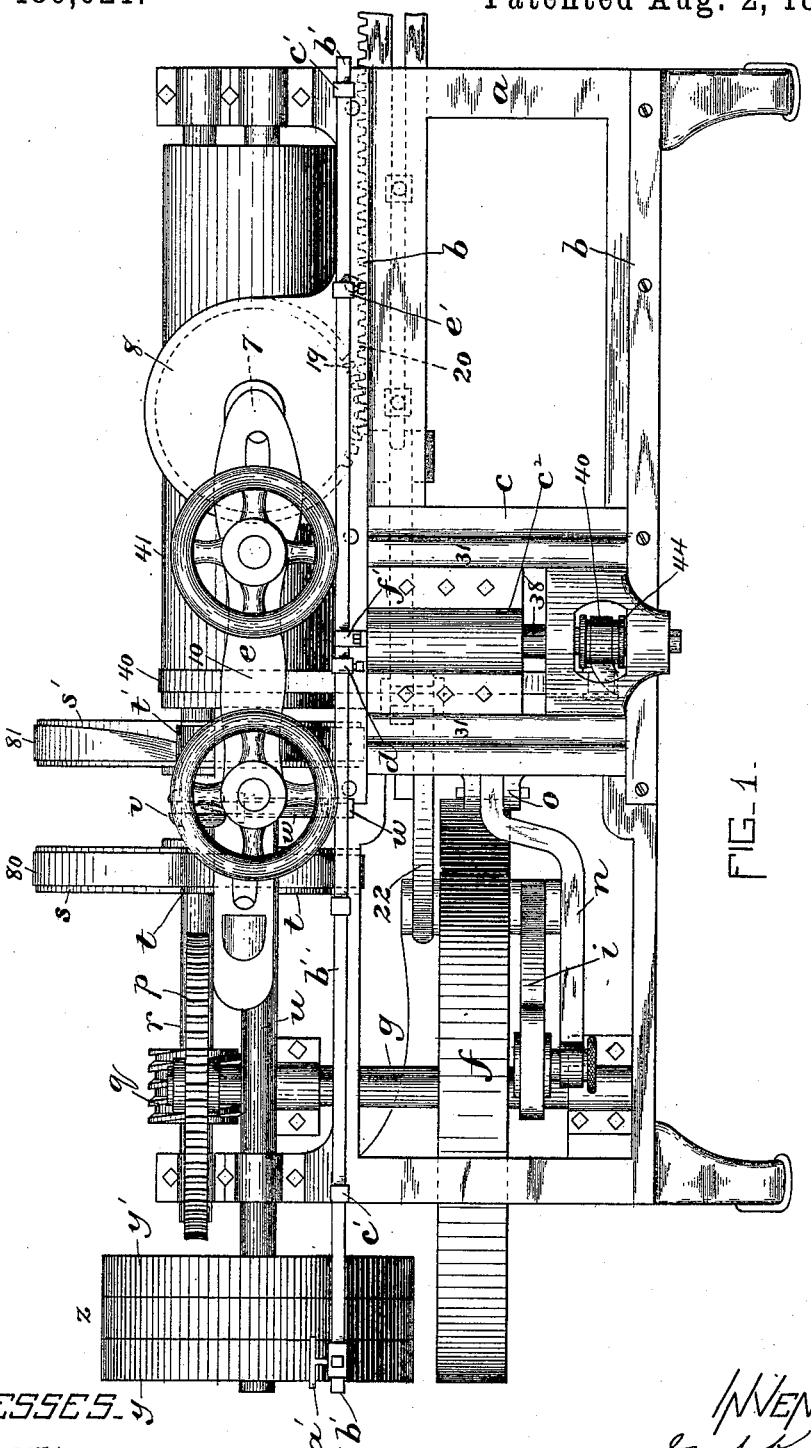
Figures 2, 2A:
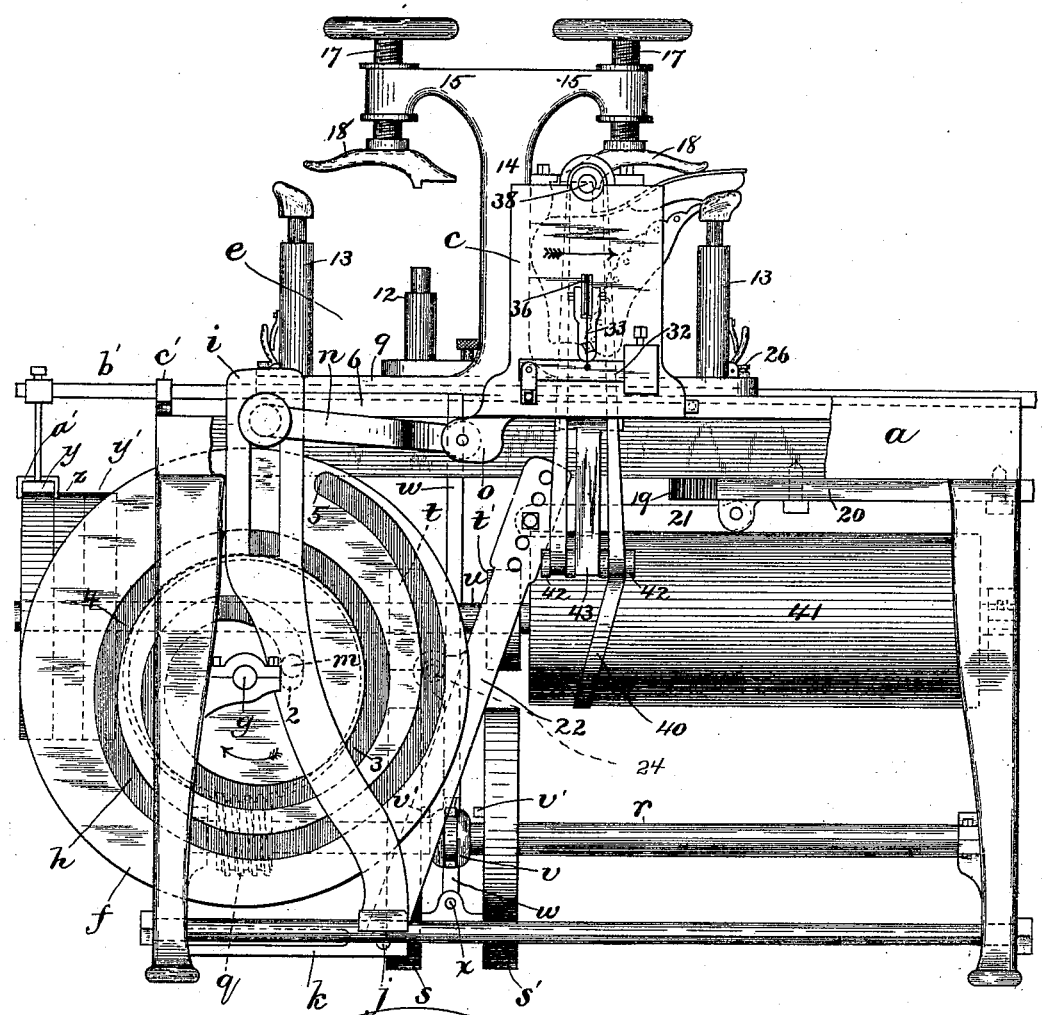
Figure 3:
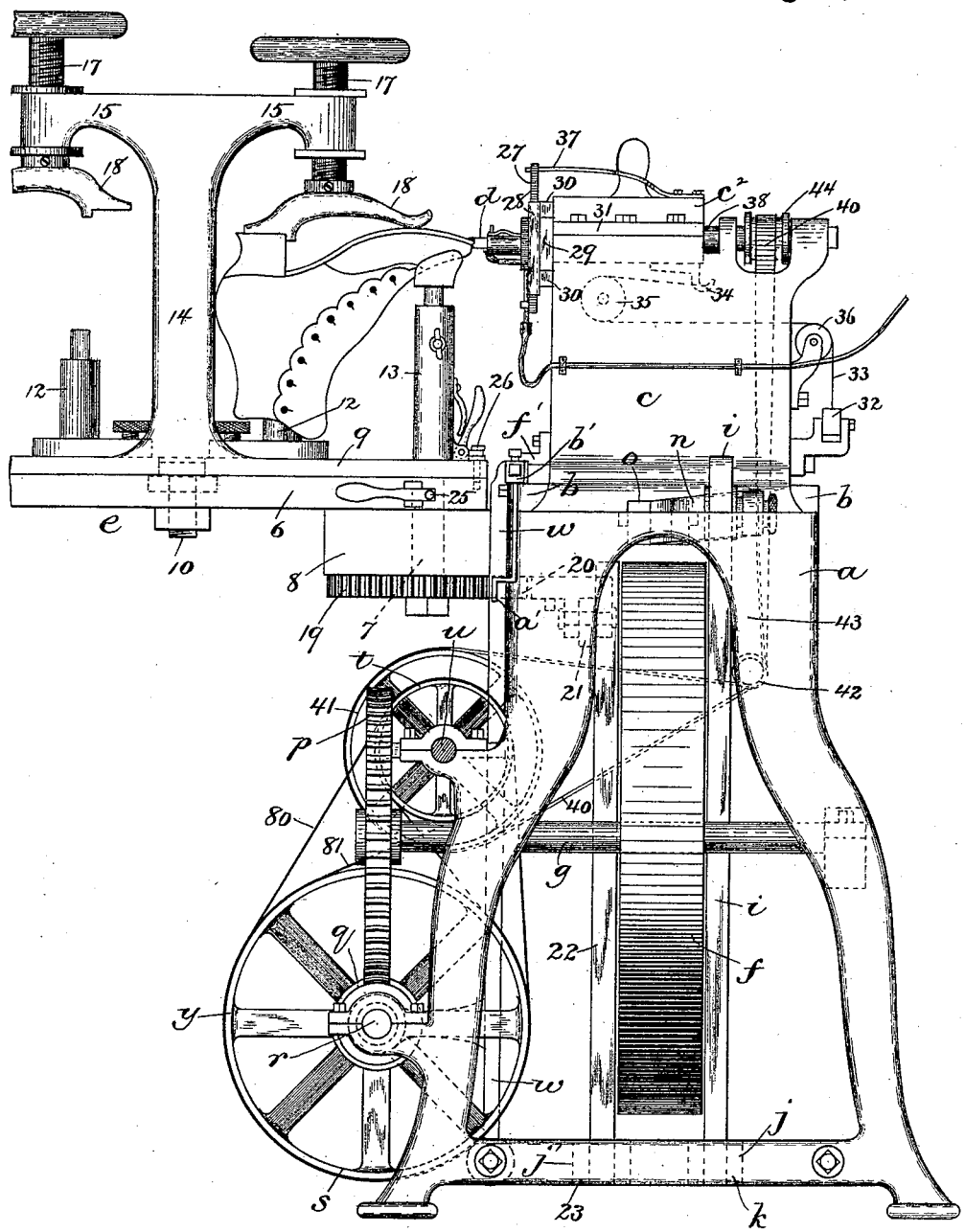

In Fig. 15 I show the vertical slide 27 controlled by a weighted lever 63 instead of by a spring, as in Figs. 3 and 4, said lever being pivoted at 64 to an ear on the carriage $c$.

In Fig. 16 I show the burnishing-tool $d$ provided with a shank 65, fitted to turn in a socket 69 on the slide 27. Said socket has a pin 67, which projects into a groove 66, formed in the shank of the tool, said groove and pin holding the shank in the socket and permitting the turning of the shank in the socket. A spring 18, attached to the socket, bears on one side of the tool and holds it yieldingly in its normal position with its lips substantially horizontal.

I prefer in some cases to use a burnishing-tool with two or more operative faces, one formed to act on the shank edge and the other on the fore-part edge, the tool being mounted so that either face can be brought into operative position.

In Figs. 17 and 18 I show a tool having two operative faces 70. Said tool is pivoted at 72 to ears 73 in the vertical slide 27, and is provided with an extension having a rack-segment 74, with which is engaged a pinion-segment on a lever 75, which is pivoted to one of said ears. By turning the lever 75 the tool can be turned to bring either face into operative position and held in any position to which it may be turned.

Fig. 20 shows the tool in full lines in one position and in dotted lines in the other position.

In Fig. 21 I show the double-faced tool provided with a cylindrical shank 65, which is grooved at 77 to engage a forked lever 78, Fig. 22, which is pivoted to one of the ears 73 and serves to move the tool from one position to the other.

In Fig. 23 I show the cylindrical shank 65 engaged by a forked arm on a slide 79, which is adapted to move on one of the ears 73, and serves to move the tool from one position to the other.

Fig. 24 shows a modification of the jack, in which the arms 15, that support the clamp-adjusting screws 17, are made in independent pieces adapted to swing independently on the central standard of the jack, so that the clamps may be swung laterally into and out of operative position, thus avoiding the necessity of moving the clamps vertically by the screws 17 to such an extent as is required when the screw-support arms are rigid, as shown in Fig. 3.

Fig. 25 shows a clamp made as a spring, so that it can bear with a yielding pressure on the heel and sole.

I claim—

1. In a sole-edge-burnishing machine, the combination of a carriage having a burnishing-tool, means for impelling said tool upon the carriage, fixed guides on which said carriage is movable in a rectilinear direction, automatic means, substantially as described, whereby said carriage is given a progressive movement on said guides, then held at rest, and then given a second progressive movement, a jack adapted to be partially rotated, and means, substantially as described, for giving said jack a half-rotation while the carriage is held at rest between its first and second progressive movements, as set forth.

2. In a sole-edge-burnishing machine, the combination of a carriage, fixed guides on which said carriage is movable in a rectilinear direction, a burnishing-tool mounted on the carriage, independent means for reciprocating said tool, automatic means, substantially as described, for giving said carriage a first and a second progressive movement in one direction, and means, substantially as described, for stopping the operation of the machine at the end of the second progressive movement, as set forth.

3. In a sole-edge-burnishing machine, the combination of a carriage, fixed guides on which said carriage is movable in a rectilinear direction, a burnishing-tool mounted on said carriage, a motor having the cam-grooved disk $f$, and connections between the same and the carriage for giving said carriage a first and a second progressive movement in one direction, and automatic means, substantially as described, for reversing the said motor and thereby giving the carriage a first and a second progressive movement in the opposite direction, as set forth.

4. In a sole-edge-burnishing machine, the combination of a carriage, a burnishing-tool thereon, a power-rotated disk $f$, having two cam-grooves $h\ h'$, connections, substantially as described, between the cam-groove $h$ and the carriage, whereby the latter is given a first and a second progressive movement in one direction and an intermediate period of rest, a jack pivotally connected to a fixed support and provided with a pinion concentric with its pivot, a movable rack engaged with said pinion, and connections, substantially as described, between said rack and the cam-groove $h'$, whereby the rack is held at rest during the progressive movements of the carriage and moved to partly rotate the pinion and jack while the carriage is at rest between said movements, as set forth.

5. In a sole-edge-burnishing machine, the combination of a carriage, a burnishing-tool thereon, a shaft, as 38, journaled in bearings on said carriage and adapted to reciprocate the burnishing-tool, means for giving the carriage a first and a second progressive movement in one direction, an elongated pulley impelled by the power that gives the carriage its progressive movements, and a belt which communicates motion from said pulley to the tool-reciprocating shaft on the carriage, said belt being adapted to move along the elongated pulley with the carriage, as set forth.

6. In a sole-edge-burnishing machine, the combination of a carriage, a burnishing-tool thereon, a shaft journaled in bearings on said carriage and adapted to reciprocate the burnishing-tool, means for moving the carriage progressively, an elongated power-driven pulley, a belt running from said pulley to the tool-reciprocating shaft on the carriage, and a bracket affixed to the carriage and provided with flanged idle-pulleys, whereby the belt is moved with the carriage along the elongated pulley, as set forth.

7. In a sole-edge-burnishing machine, the combination of a carriage, a burnishing-tool thereon, a driving-shaft $u$, having fast pulleys $y\ y'$ and a loose pulley $z$, intermediate means operated by said shaft, whereby the carriage is moved progressively, a belt-shipper engaged with a driving-belt on said pulleys and having adjustable collars $d'\ e'$, and a projection $f'$ on the carriage arranged to strike said collars and move the shipper to stop the machine at the end of the progressive movement of the carriage in each direction, as set forth.

8. In a sole-edge-burnishing machine, the combination of the shaft $u$, having the fast pulleys $y\ y'$ and loose pulley $z$, the shaft $u$, the loose pulleys $s\ s'$ on said shaft connected by belts 80 81 with fast pulley $t\ t'$ on the shaft $u$, one of said belts being crossed and the other open, a clutch $v$ on the shaft $r$, adapted to engage either the pulley $s$ or the pulley $s'$ with said shaft, a carriage $c$, having a burnishing-tool, the cam-grooved disk impelled by a connection with the shaft $r$, connections between said disk and the carriage whereby the latter is moved progressively by the rotation of said disk, a shipper $a'$, engaged with the belt that imparts motion to the shaft $u$, a bar $b'$, carrying said shipper and provided with collars $d'\ e'$, a lug $f'$ on the carriage $c$, arranged between said collars and adapted to move the bar and shipper to stop the operation of the machine at the ends of the progressive movement of the carriage, and a connection, as the lever $w$, between the shipper-bar and the clutch $v$, whereby a movement of the shipper-bar by the operator to start the machine after each stoppage thereof also reverses the rotation of the disk $f$ and changes the direction of the progressive movement of the carriage, as set forth.

9. In a sole-edge-burnishing machine, a jack composed of a base-plate connected at one end by a pivot 7 to a fixed support, an upper plate connected centrally to said base-plate by a pivot 10 at one side of the pivot 7, and duplicate boot or shoe holding devices supported by said upper plate at opposite sides of the pivot that connects the latter with the base-plate, combined with a burnishing-tool, and means, substantially as described, for presenting said tool to a sole-edge supported by said jack, as set forth.

10. In a sole-edge-burnishing machine, a jack composed of a base-plate connected at one end by a pivot 7 with a fixed support, an upper plate 9, connected centrally by a pivot 10 with said base-plate and having a central post 14, arms 15 on said post, screws 17, working in sockets in two pairs of standards 12 13 on the upper plate 9, said arms and clamps on said screws formed to bear simultaneously on the heels and soles of boots or shoes supported by said standards, combined with a burnishing-tool, and means, substantially as described, for presenting said tool to a sole-edge supported by said jack, as set forth.

11. In a sole-edge-burnishing machine, the combination of a carriage, fixed guides on which said carriage is movable in a rectilinear direction, means for moving the carriage progressively, a holder, as 53, mounted on the carriage and provided with parallel guides and with locking devices, whereby it may be secured to the carriage with said guides in either a horizontal or an inclined position, and a reciprocating cross-head fitted to move on the guides supported by the cross-head, as set forth.

12. In a sole-edge-burnishing machine, the combination of a carriage, fixed guides on which said carriage is movable in a rectilinear direction, means for moving the same progressively, a reciprocating cross-head movable on guides on the carriage, vertical guides on said cross-head, a slide movable vertically on said guides, and a burnishing-tool carried by said slide and adapted thereby to rise and fall while in operation, as set forth.

13. In a sole-edge-burnishing machine, the combination of a carriage, fixed guides on which said carriage is movable in a rectilinear direction, means for moving the carriage progressively, a reciprocating cross-head movable on guides on said carriage, a vertically-movable slide on said cross-head, a burnishing-tool carried by said slide, and an arm or presser-foot attached to said slide and adapted to bear on the tread-surface of the sole of a boot or shoe held in a fixed position, whereby said slide and tool are caused to rise and fall by the curvature of said tread-surface, as set forth.

In testimony whereof I have signed my name to this specification, in the presence of two subscribing witnesses, this 27th day of August, A. D. 1889.

GEORGE A. KNOX.

Witnesses:
C. F. BROWN,
ARTHUR W. CROSSLEY.